(12) United States Patent
Robertson et al.

(10) Patent No.: US 7,512,300 B2
(45) Date of Patent: *Mar. 31, 2009

(54) COMPOUND OPTICAL AND ELECTRICAL CONDUCTORS, AND CONNECTORS THEREFOR

(75) Inventors: Jonas J. Robertson, Harvey, LA (US); Robert M. Courrie, Dollard-des-Omeaux (CA); Problems Currie, legal representative, Pollack, LA (US)

(73) Assignee: Plastic Inventions and Patents, Inc., Saint Laurent (CA)

( * ) Notice: Subject to any disclaimer, the term of this patent is extended or adjusted under 35 U.S.C. 154(b) by 61 days.

This patent is subject to a terminal disclaimer.

(21) Appl. No.: 10/532,098

(22) PCT Filed: May 16, 2003

(86) PCT No.: PCT/US03/14533

§ 371 (c)(1),
(2), (4) Date: Aug. 30, 2006

(87) PCT Pub. No.: WO2004/038469

PCT Pub. Date: May 6, 2004

(65) Prior Publication Data

US 2007/0071393 A1    Mar. 29, 2007

Related U.S. Application Data

(60) Provisional application No. 60/419,548, filed on Oct. 21, 2002.

(51) Int. Cl.
*G02B 6/44* (2006.01)
*F21V 7/04* (2006.01)

(52) U.S. Cl. ........................ 385/101; 385/901; 362/630

(58) Field of Classification Search .................. 385/101, 385/901; 362/630, 631; 349/67
See application file for complete search history.

(56) References Cited

U.S. PATENT DOCUMENTS

| 5,333,228 | A | 7/1994 | Kingstone |
| 5,982,969 | A | 11/1999 | Sugiyama |
| 6,217,201 | B1 | 4/2001 | Hulse |
| 6,438,302 | B1 | 8/2002 | Utsui et al. |
| 6,450,678 | B1 | 9/2002 | Bayersdorger |
| 6,577,794 | B1 * | 6/2003 | Currie et al. ................. 385/101 |
| 6,974,239 | B2 * | 12/2005 | Currie et al. ................. 362/558 |

\* cited by examiner

*Primary Examiner*—Michelle R Connelly Cushwa
(74) *Attorney, Agent, or Firm*—Merek, Blackmon & Voorhees, LLC (57) ABSTRACT

A compound optical and electrical conductor includes a fiberoptic light transmitting element (multiple fibers or single solid rod) with at least one solar cell with LED therewith. The electrical conductor or conductors may be imbedded or otherwise secured within the optically conducting element or its surrounding jacket or sheath (20), or may be contained in a separate elongate retainer which may be provided to hold the optically conducting element in place as desired. The conductors may include a jacket or retainer (112) which is optically open along one side thereof, allowing the optical conductor (14) to emit light laterally therefrom subtending an angle defined by the optical gap in the jacket or retainer. One or more compound connectors may be provided, for linking two or more such compound conductors together as desired. The connectors provide for both the concentric alignment of the optical conductors, and also the electrical connection of the electrical conductors (16a-16c) of the compound devices. The connectors preferably each include one or more lighting elements to compensate for light attenuation along the lengths of the attached optical conductors.

6 Claims, 6 Drawing Sheets

COMPOUND OPTICAL AND ELECTRICAL CONDUCTORS, AND CONNECTORS THEREFOR

FIELD OF THE INVENTION

The present invention relates generally to the field of fiberoptic light transmission, and more specifically to fiberoptic or acrylic cables or rods having electrically conductive elements included therewith. A means of electrically and optically connecting a series of individual lengths of such fiberoptic and electrically conductive elements is also disclosed herein.

BACKGROUND OF THE INVENTION

Description of the Related Art

Light transmission using light conductive means (cables, rods, etc.) has been known for some time. Conventionally, such devices generally comprise a generic or specially compounded acrylic plastic (e.g. Lucite,™) formed as single rods or multiple strands or fibers, which are coated for internal reflectivity and encased in an opaque jacket or casing. This system has been used in many applications for the transmittal of light from one end of the cable to the other, i.e. axial transmission of light.

More recently, the inclusion of electrically conductive wiring or cables with fiberoptic cables, has been accomplished. Generally, such compound cables have included the electrically conductive elements within the core of the fiberoptic device, where it affects the light transmissivity of the cable or rod. Alternatively, the electrical conductors have been placed within the surrounding opaque jacket for the fiberoptic cable. In any event, these compound devices of the prior art have been intended for axial light and electrical transmission, and have not provided for radial light emission from the length of the fiberoptic core. Also, such devices have been constructed to have a predetermined length, for installation in certain specific environments (motor vehicles, etc.).

Accordingly, a need will be seen for a compound optical and electrical conductor, which is capable of emitting light radially to serve as a continuous elongate lighting device, while simultaneously carrying electrical current axially through the electrical conductor(s) included therewith.

OBJECTS AND SUMMARY OF THE INVENTION

The present invention comprises a compound optical or light transmitting and electrical conductor, with the optical conducting element composed of a plurality of optical fibers or strands or a single optically transmitting rod or the like. The conductor further includes at least one electrical conductor therewith, extending the length of the cable with the optically conducting element. One or more connectors may be used to secure two or more such conductors together, as desired.

The present compound conductors provide lateral light emission and are adapted particularly for warning and/or marking lights installed along a large panel or the like. The present lighting system may be installed along the sides of trailers, boats, and ships, etc., as desired. Due to light attenuation along the length of such a fiberoptic device, additional light must be provided at various points therealong. The connectors include such supplemental lighting means, with the electrical of the devices supplying the electrical energy required for the supplemental lighting at each of the connectors. The light source is preferably an LED. The connectors may further include means for coloring or filtering the light emitted therefrom, in order to provide a specific color from the light emitting portions of the conductors. The connectors may also include self-powering means such as a battery recharge by solar power or similar means. A photosensing device for detecting nightfall or low light conditions may be provide for actuating the LED or other light source and a backup photosensing device may be used for detecting an LED light source turning on the other LEDs and their connectors simultaneously.

Accordingly, it is a principal object of the invention to provide an improved compound optical and electrical conductor, including optical and electrical transmission means therein.

It is another object of the invention to provide an improved compound optical and electrical conductor, which electrical conducting elements may be installed within the optically conducting portion or which may be installed within a base or retaining component for the optically conducting element.

Yet another object of the present invention is to provide an improved compound optical electrical conductor including an opaque outer jacket with a longitudinal light transmissive opening, for emitting light laterally in a defined arc from the conductor.

It is a further object of the invention to provide an improved compound optical and electrical conductor including connector means therewith, for optically connecting two or more such compound conductor elements together as desired.

An additional object of the invention is to provide an improved compound optical and electrical conductor, which connector means, includes additional lighting for compensating for light attenuation along the length of the optically conducting elements.

Still another object of the invention is to provide a compound optical and electrical conductor, which connector means include means for providing different light colors to the attached optical conductor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE EMBODIMENTS

The present invention comprises various embodiments of compound optical and electrical conductors, and includes cooperating connectors permitting two or more such conductors to be linked together optically and electrically. The electrical conductors provide electrical power for lighting installed within each connector, with each connector thus providing an additional light source to compensate for attenuation along the length of the optical conductor. The present conductors emit light laterally ('side lighting'), and thus are particularly well suited for use in lighting and marking large moving objects, e.g., tractor trailers, larger van type trucks, and even smaller pickup trucks and vans. It will be seen that their application may be carried over to boats, ships, and aircraft as well, and may be used to mark large stationary objects in close quarters (narrow alleyways, loading docks, etc.) and for advertising and display purposes as well.

Figure 1:
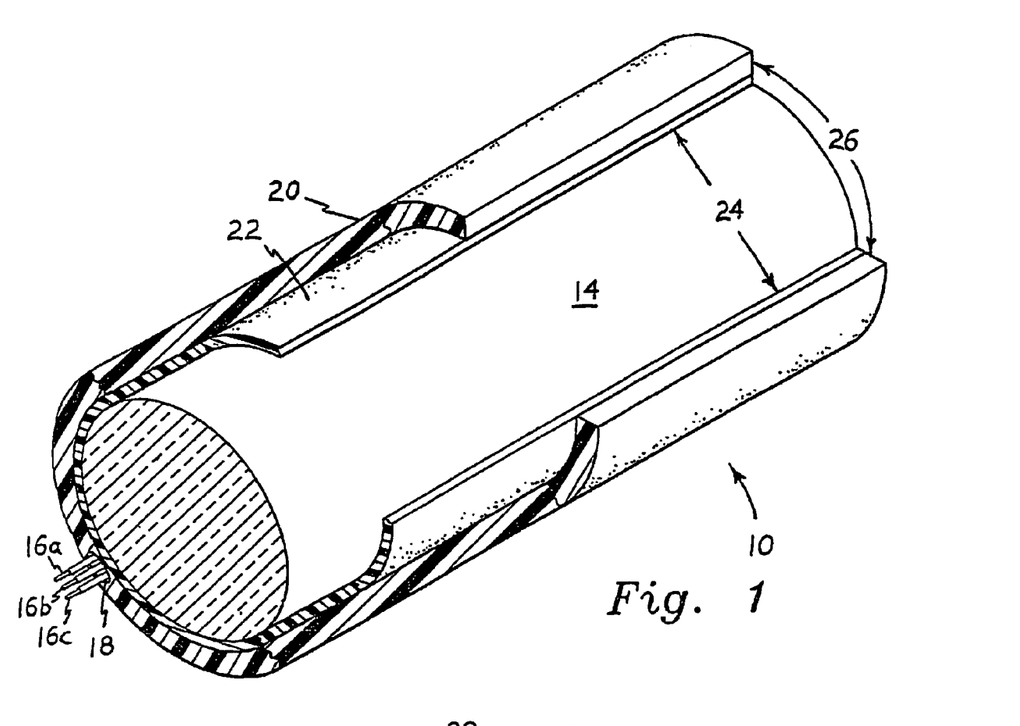
FIG. 1 is a perspective view in partial section, showing the various elements of a first embodiment of the present compound conductor invention.
Figure 2:
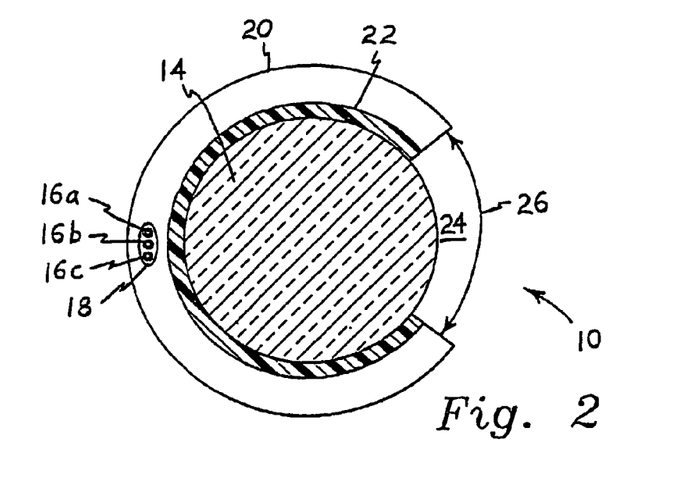
FIG. 2 is an end elevation view in section of the compound conductor of FIG. 1.
Figure 3:
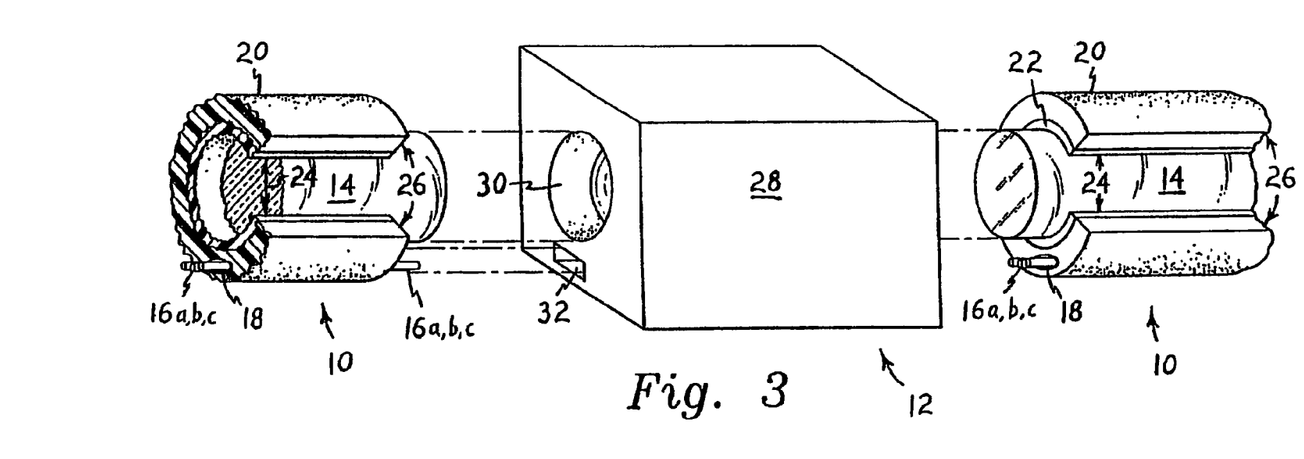
FIG. 3 is an exploded perspective view of opposite ends of two conductors of FIGS. 1 and 2, and a compound optical and electrical connector therewith.
Figure 4:
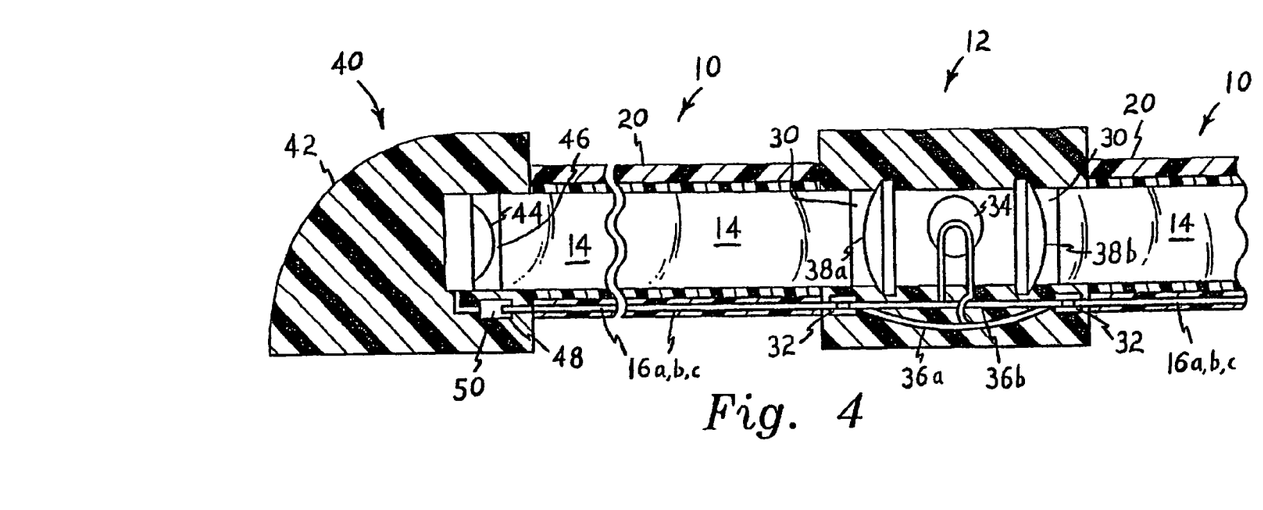
FIG. 4 is a side elevation view in section of the conductor and connector assembly of FIG. 3 showing their assembly together, and further illustrating an end cap device.
Figure 5:
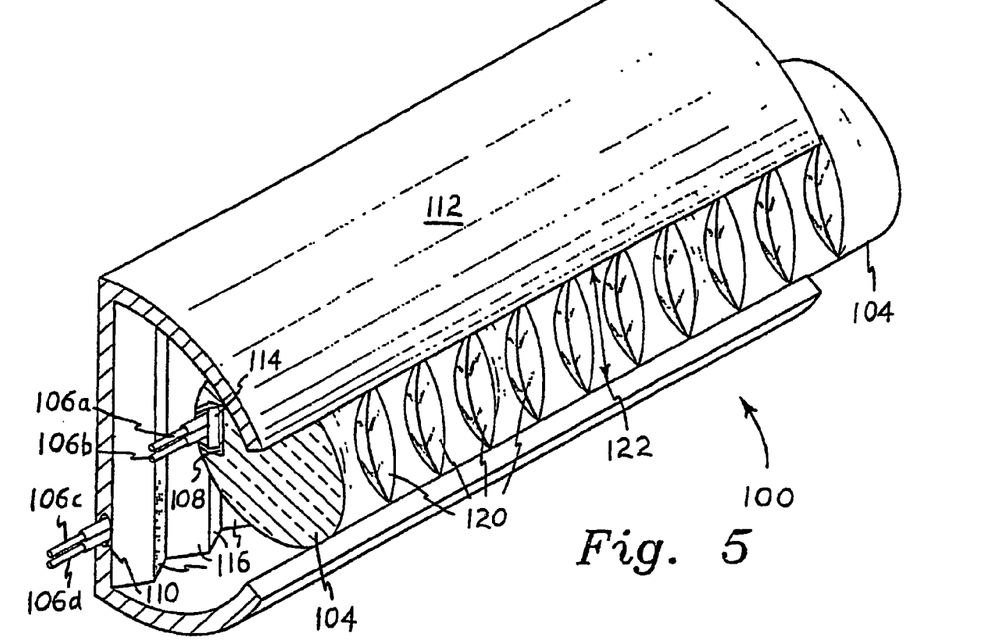
FIG. 5 is a perspective view in partial section, showing the various elements of a second embodiment of the present compound conductor invention.

FIGS. 1 through 4 illustrate a first embodiment of the present invention, comprising a compound optical and electrical conductor 10 and cooperating connector 12 (shown in FIGS. 3 and 4). The larger mass and volume of the conductor 10 comprises a light transmitting element 14 (conventional fiberoptic cable formed of a plurality of individual fiberoptic strands, or one or more large diameter, solid core elements, as shown). The use of solid acrylic plastic material for the optical conductor element 14 precludes any requirement for ultraviolet protection, as necessary for other materials specially formulated for light transmission.

One or more electrical conductors, e.g., conductors 16a through 16c of FIGS. 1 through 4, extend through a passage 18 formed in the opaque polymer outer jacket or protective sheath 20 of the conductor assembly 10. It will be noted that only a single electrical conductor is required where all connector lighting is to be actuated simultaneously, and the assembly is electrically grounded to the vehicle structure. However, the present invention also provides for plural lights which may be selectively actuated as desired, to provide different colors of illumination for the optical conductors as desired. Such plural lights may be selectively operated by a corresponding electrical conductor and conventional switch apparatus (not shown).

A reflective coating 22 (tape, paint, etc.) may also be applied around the majority of the circumference of the optical conductor 14, to provide greater brightness for the optical element 14. It will be noted that the outer sheath 20 and reflective coating 22 have an optically open side 24 extending arcuately about a portion of the optical conductor 14, and extending the length of the optical conductor 14. The light thus emitted from this optically open lateral passage 24 subtends an arc 26 defined by the width of the optically open passage 24, for emitting light radially and laterally from the optical conductor 14. In the event that a specially formed light transmitting material is used for the light conductor 14 (e.g., Lucite, tm), an ultraviolet protective barrier (not shown) may be applied to the material to preclude yellowing due to ultraviolet exposure, as is known to the art.

A cooperating compound connector 12 for the above described conductors 10 is shown in FIGS. 3 and 4 of the drawings. The connector 12 comprises a housing 28 having mutually concentric light passages 30 at opposite ends thereof. It will be seen that the connector may be formed to have more than two opposed light passages, e.g., a light passage formed in each face thereof, or may be formed in a shape other than a rectangular solid to provide additional light passages at other than rectilinear angles. A corresponding number of electrical connector receptacles 32 is also provided adjacent each light passage 30, for accepting the connecting ends of the electrical conductors 16a through 16c (or other number of electrical conductors) and electrically connecting the electrical conductors to the light means housed within the connector housing 28. It will be seen that the receptacles 32 are equipped with conventional multiple pin sockets, e.g., Molex ™ connectors, etc., in order to separate the electrical conductors 16a through 16c electrically from one another.

The optical conductors 14 of two (or more) separate compound conductors 10 are inserted into the corresponding optical connector receptacles or light passages 30 of the housing 28, with the axially offset electrical conductors 16a through 16c connecting with the electrical receptacles 32 which are in registry with the wiring 16a through 16c. The connector ends of the wiring 16a through 16c are preferable sufficiently heavy and rigid to provide the compressive and bending strength necessary to 'plug in' to the corresponding receptacles 32.

FIG. 4 provides a cross sectional view of such an assembly, and the internal components of the connector 12. The connector 12 includes some form of electrical lighting means therein, such as the electrically driven light source 34 shown, which receives electrical power from the corresponding electrical conductors 36a, 36b which communicate electrically with at least two of the conductors 16a through 16c of the compound conductors 10. It will be understood that this light source 34 may comprise any practicable type desired, e.g., incandescent, halogen, bright light emitting diode, etc. Lenses 38a, 38b are provided to each side of the light means 34, to focus the light from the light source(s) 34 to each optical conductor 14 extending from each side or end of the connector 12, thereby serving to compensate for light attenuation through the optical conductors 14 extending to each side thereof.

Figure 8:
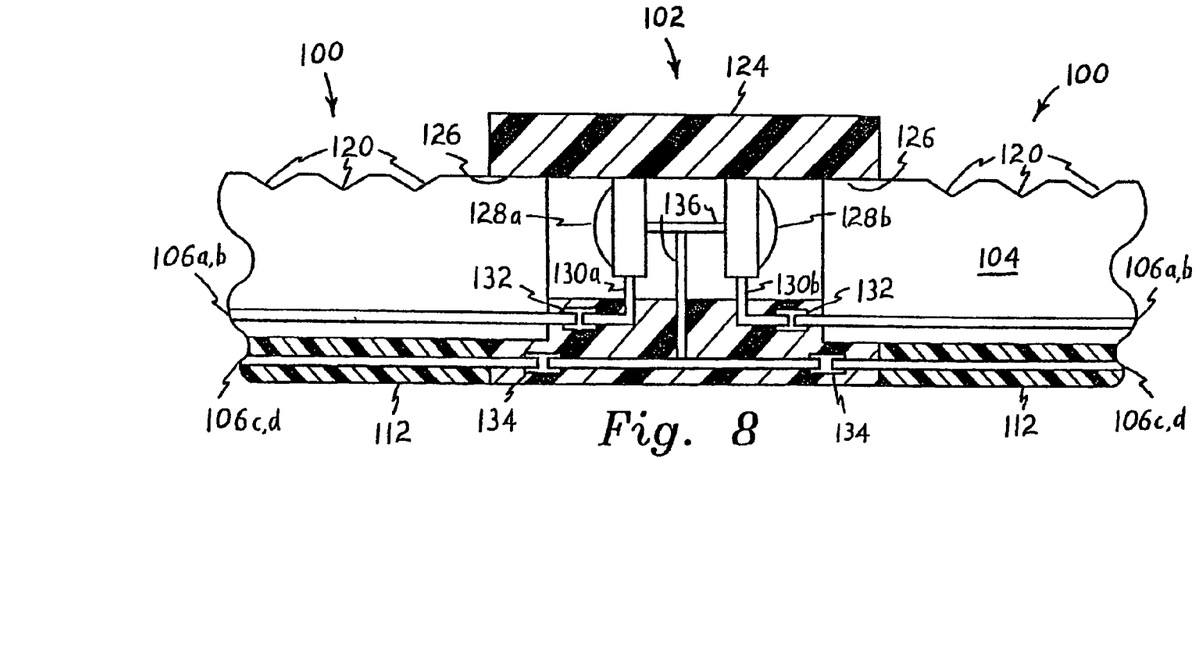
FIG. 8 is a side elevation view in section of the conductor and connector assembly of FIG. 7 showing their assembly together.

More than a single light source 34 may be provided within the connector, as illustrated in FIG. 8 of the drawings and discussed in detail further below. These plural light sources may be colored differently from one another, with electrical power being selectively applied to each separately or collectively to provide different colored light emission form the connected optical conductors 14. In the case of a motor vehicle or trailer, these different lights may be correspondingly colored and electrically connected to the overall lighting system, brake light and turn signal switches, etc., to actuate automatically when those systems are operated.

FIG. 4 also illustrates a cross sectional view of an end cap assembly 40 which may be incorporated with the present compound conductor assembly 10, and/or modified for use with other embodiments as desired. The end cap 40 includes a housing 42 which contains one or more light sources, e.g., bright light emitting diode 44, etc. A single light passage 46 for accepting the end of an optical conductor 14 is formed in one side or end of the housing 42, concentrically with the light source 44 and optical conductor 14 connected thereto. A corresponding single electrical receptacle 48 is also provided, aligned with the one or more electrical conductors 16a through 16c for electrically connecting those conductors to an electrical conductor(s) 50 supplying electrical energy to the light source 44. The end cap assembly 40 thus essentially resembles one half of the connector assembly 12, with one side or end of the end cap 40 comprising an opaque closure.

Figure 6:
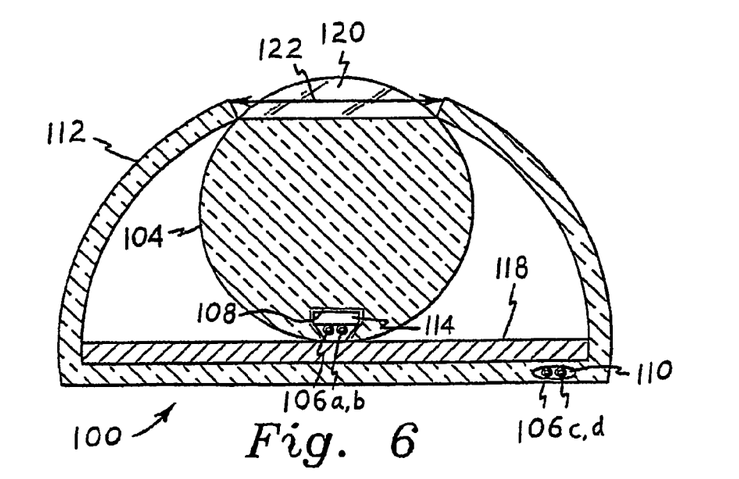
FIG. 6 is an end elevation view in section of the compound conductor of FIG. 5.
Figure 7:
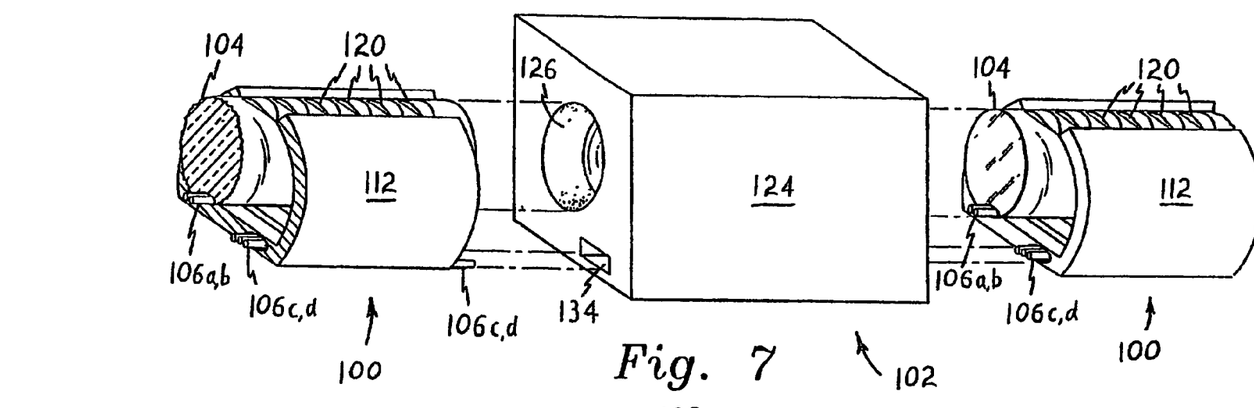
FIG. 7 is an exploded perspective view of opposite ends of two conductors of FIGS. 5 and 6, and a compound optical and electrical connector therewith.

FIGS. 5 through 8 illustrate another embodiment of the present compound conductor invention, essentially comprising a compound conductor 100 and cooperating compound connector 102 (shown in FIGS. 7 and 8). The conductor 100 includes a light transmitting element 104 and one or more electrical conductors, e.g., conductors 106a through 106d of FIGS. 5 through 8. These electrical conductors may be grouped in a single cable or bundle, as in the conductors 16a through 16c of the first embodiment of FIGS. 1 through 4, or may be grouped in two or more runs each consisting of one or more conductors 106a, 106b and 106c, 106d, as shown in FIGS. 5 through 8.

In FIGS. 5 through 8, a first group of electrical conductors 106a, 106b, is installed in a channel 108 which is formed in the periphery of the optical conductor element 104, with a second group of electrical conductors 106c, 106d installed in a passage 110 formed in the partially surrounding retainer 112 for the optical conductor element 104. The electrical conductors 106a, 106b are preferably installed in the optical conductor channel 108 as an assembly with a reflective element 114 disposed immediately above, i.e., inwardly toward the center of the optical conductor 104, relative to the electrical conductors or wires 106a, 106b.

This reflective element 114 may comprise a series of polished or brightly colored (white, etc.) laterally disposed facets along the length of the electrical conductor assembly, with the assembly comprising conductors 106a, 106b, and reflective elements 114 snapping in place or being inserted from one end of the optical conductor channel 108. The reflective element 114 adds considerable brilliance to the optical conductor element, and may be formed in various alternative ways, e.g., etching the surface to provide a 'frosted' appearance, etc., as desired.

In a similar manner, the retainer 112 may include a series of laterally disposed facets 116 extending across the floor thereof, to provide greater reflectivity and brilliance for the overlying optical conductor 104 of the assembly. Alternatively, the floor of the retainer 112 may be coated with an outwardly reflective or phosphorescent tape or other coating 118, as shown in FIG. 6 of the drawings.

It will be seen that the optical conductor 104 may be alternatively formed with a hollow core to have a toroidal cross section, with one or more electrical conductor(s) passing through the hollow center of the optical element 104. Such a hollow core optical conductor is illustrated in U.S. Pat. No. 4,806,289 discussed in detail in the discussion of the related art further above the optical conductor 104 may also be formed with a series of laterally disposed reflective facets 120 formed in the upper or outer surface thereof if so desired, as shown in FIGS. 5 through 8 of the drawings. Such material is manufactured by the 3M company and is know as 'Extraction Fiber'™, and may be incorporated with the present invention, if so desired.

The retainer or track 112 of the compound conductor embodiment 100 of FIGS. 5 through 8 is configured somewhat like the jacket or cover 20 of the compound conductor of FIGS. 1 through 4, in that retainer 112 surrounds the majority of the optical conductor 104, with a relatively narrow light emitting passage 122 formed longitudinally along one side thereof. This limits the light output to an arc defined by the optically open passage 122, in a manner similar to that of the optically open passage 24 of the jacket 20 of the embodiment of FIGS. 1 through 4. Alternatively, the retainer 112 may be formed of a transparent or translucent material (plastic, etc.), as shown in FIG. 6 of the drawings, thus providing a wider arcuate light output therefrom. The arcuate light passage opening 122 of the retainer 112 also provides access for the installation of the optical conductor 104 therein.

A cooperating compound connector 102 for the optical conductors 100 is illustrated in FIGS. 7 and 8 of the drawings. The connector 102 of FIGS. 7 and 8 is configured similarly to the first embodiment connector 12 of FIGS. 3 and 4, comprising a housing 124 with lighting means therein. The housing may have two or more light passages 126, which serve as means for connecting a series (two or more) optical conductors 104 thereto.

FIG. 8 provides a cross sectional view of such an assembly, and the internal components of the connector 102. The connector 102 includes a plurality of lighting means therein (i.e., at least two lights 128a and 128b) which receive electrical power from the corresponding electrical conductors 130a, 130b which communicate electrically with at least two of the conductors 106a, 106b by means of a receptacle or connector 132. The lights 128a and 128b may comprise any practicable electrical light type desired, e.g., incandescent, halogen, bright light emitting diode, etc. Preferably, each of the lights 128a, 128b comprises a plurality of electrically separate bright light emitting diodes (LEDs) of different colors (e.g., red, amber, etc.), which are known in the art. The multiple electrical conductors 106a, 106b may selectively provide electrical power to each LED as desired, to illuminate the corresponding optical conductor with the color of the illuminated LED. Further selectivity for additional LEDs may be provided by multiple ground connections through the electrical conductors 106c, 106d and corresponding connectors 134, rather than the common ground indicated by the connector electrical conductor 136.

Figure 9:
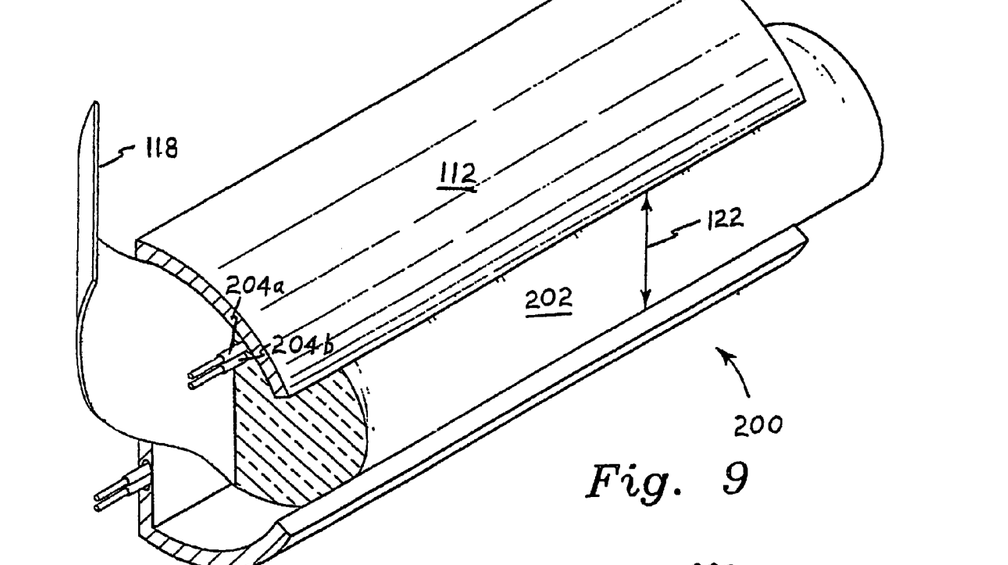
FIG. 9 is a perspective view in partial section, showing the various elements of a third embodiment of the present compound conductor invention.
Figure 10:
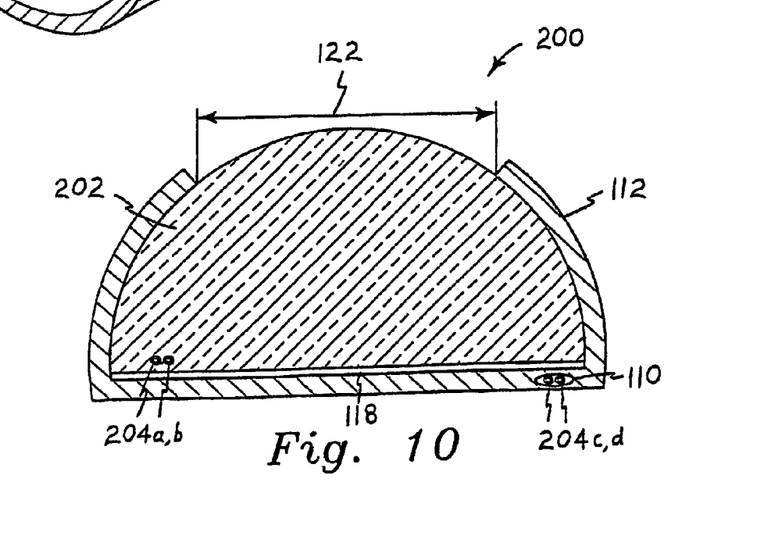
FIG. 10 is an end elevation view in section of the compound conductor of FIG. 9.

FIGS. 9 and 10 illustrate yet another embodiment of the present compound optical and electrical conductor invention, wherein the compound conductor 200 includes an optical conductor element 202 having a semicircular of D-shaped cross section. This cross sectional shape is well suited for installation within a correspondingly shaped retainer or jacket 112, identical to the generally D-shaped retainer or jacket 112 illustrated in FIGS. 5 through 8 of the drawings for the second embodiment compound conductor 100.

However, in the embodiment of FIGS. 9 and 10, the first electrical conductors 204a, 204b are imbedded integrally within the body of the optical conductor 202. This may be done at the time of manufacture of the optical conductor 202, by casting or molding the wiring 204a, 204b in place simultaneously with the casting or molding of the optical conductor 202. Preferably, the electrical conductors or wiring 204a, 204b are positioned well away from the optically exposed surface of the optical conductor 202, in order to provide optimum light output from the device. The electrical conductors 204a, 204b may be wrapped or otherwise covered with a highly reflective or phosphorescent coating in order to provide greater reflectivity and light output, if so desired.

In a similar manner, the electrical conductors 204c, 204d may be cast or molded integrally within the base or other area of the retainer 112 at the time of manufacture, if so desired, or run through a conduit or passage 110 formed in the retainer 112, as in the embodiment of FIGS. 5 through 8 of the drawings.

As in the cases of the other embodiments shown in FIGS. 1 through 8 and discussed further above, the retainer 112 surrounds the majority of the optical conductor 202, with a relatively narrow light emitting passage 122 formed longitudinally along one side thereof. This limits the light output to an arc defined by the optically open passage 122, in a manner similar to that of the optically open passage 24 of the jacket 20 of the embodiment of FIGS. 1 through 4. Alternatively, the retainer 112 may be formed of a transparent or translucent material (Plastic, etc.), as shown in FIG. 6 of the drawings, thus providing a wider arcuate light output therefrom. The arcuate light passage opening 122 of the retainer 112 also provides access for the installation of the optical conductor 202 therein. A sheet or coating 118 of highly reflective or phosphorescent material (tape, etc.) may be applied to the bottom or flat surface of the generally D-shaped retainer 112, as in the embodiment of FIG. 6 of the drawings. This adds further reflectivity and brightness to the assembly, for even greater efficiency.

While no connector component is illustrated for the compound conductor embodiment of FIGS. 9 and 10, it will be seen that either of the connector embodiments 12 or 102, respectively of FIGS. 3, 4 and 7, 8 may be adapted to mate with such a D-shaped optical conductor element 202. Similarly, the end cap element 40 illustrated in FIG. 4 of the drawings may also be adapted for use with any of the other optical conductor elements of the present invention, as desired.

In conclusion, the present compound conductor invention serves as an efficient means of providing a cautionary or warning illumination for a vast number of moving and stationary objects. It is well known that optical conductors ('fiberoptics') dissipate their illumination along their lengths, and until the development of the present invention, were not suitable for marking relatively long spans due to the light loss along the length thereof. The present invention, with its periodic lighting means installed at the connectors thereof and the additional electrical conductors providing electrical power for the lighting means, overcomes this problem to enable such fiberoptic type lighting to be used over spans of indefinite length as desired.

Figure 11:
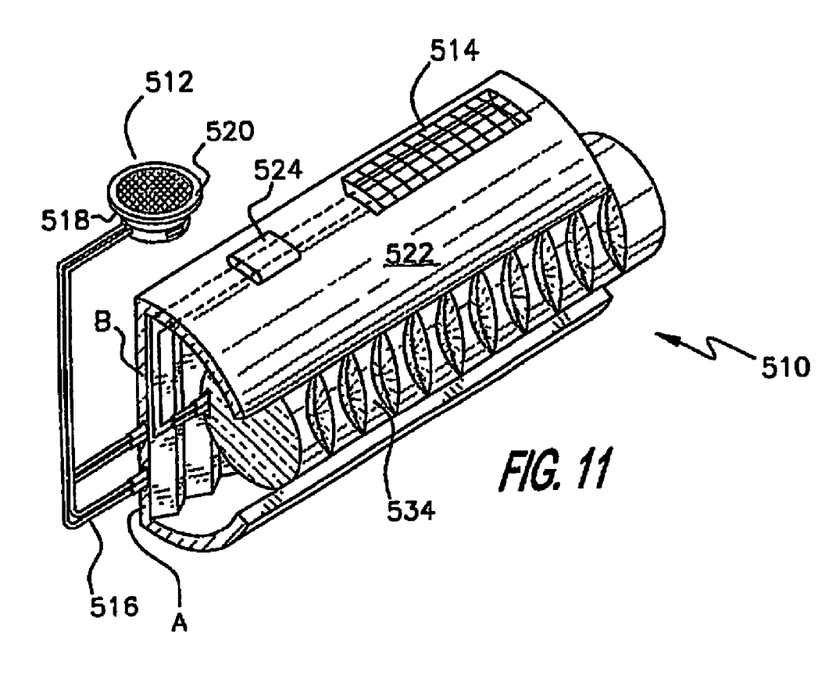
FIG. 11 is a perspective view in partial section, showing the various elements of a further embodiment of the present compound conductor invention having a solar cell and battery power source.
Figure 12:
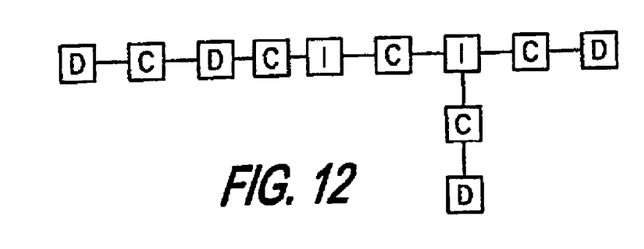
FIG. 12 is a diagrammatic view of a chain of solar ("independent") powered compound optical and electrical conductors and non-solar ("dependent") powered compound optical and electrical conductors.

While the compound optical conductors and connectors are preferably powered by a single power source, FIG. 11 shows a further embodiment which is especially useful in remote locations or where power is at a premium or unavailable. FIG. 11 show an compound optical and electrical conductor 510 having two solar cells 512, 514 which are preferably used as alternatives to each other rather than in conjunction with each other, though one skilled in the art would recognize that the solar cells can be used together.

A first, external solar cell 512 power source converts solar energy into electrical energy. Since the lights will typically be powered when sun light is unavailable (i.e., at night), the electricity generated by the solar cell should be stored in a battery 518 or similar device. Appropriate circuitry well known to those skilled in the art may be provided to correct the amperage, voltage, etc. of the power delivered to or from the battery on the solar cell. The battery can then be connected to at least one of the electrical conductors 516 on the compound optical and electrical conductor to power some or all of the light sources 534 contained therein to cause the lights to illuminate. A light sensor or photosensor 520 can be provide to automatically turn on the lights at the appropriate times. Additional circuitry can be provided (not shown) which causes the light to strobe or blink or to control the color of the LED or other light source 534.

Solar cell 514 shows an analogous system with the solar cell 513 and battery 524 incorporated into the retainer 522 to conserve space. An external solar cell, however, may be desirable where the placement of the compound optical and electrical conductor would decrease the effectiveness of the solar panel. The batteries 518,524 could also be powered by another power source such as wind, nuclear, hand-turned or gas generator or other appropriate power source to act as an independent power source.

The solar cell, battery powered ("independent") compound optical and electrical conductor can be used in place of or in conjunction with the non-solar powered ("dependent") compound optical and electrical conductor. By providing a separate power leads (at "A") in addition to the above described conductors (at B), the solar power, battery power can be used as a fail safe lighting mechanism only when the main power fails. In such a configuration, where lighting was essential to safety, for instance, the normally electrically powered lights compound conductors could draw power from the solar cells and respective batteries if the electrical power failed (or vice versa, the electrical power could be used to supplement solar power). Appropriate switches and circuitry (not shown) could be used to protect the batteries, convert AC to DC power where necessary, and connect the electrical wire input 516 to the battery on failure of the electrical power. Since the compound conductors can be all electrically connected through the use of the above described connectors, as shown in FIG. 11, the use of spaced apart solar powered compound optical and electrical conductors I connected through appropriate connectors C to non-solar powered compound optical and electrical conductors D will ensure that each is lit even during a power failure. The number of solar powered compound optical and electrical conductors necessary will be determined by the power draw of the light sources, line losses, the capacity of the solar cells, the capacity of the batteries and the amount of time that the system would need to operate without the main power source.

Of course, the system could be operated as shown in FIG. 11 without any outside power source other than the solar powered cells. If all of the compound optical and electrical conductors are solar powered, then there would be no reason to electrically interconnect the compound optical and electrical conductors. The lines 516 could be used instead to transfer control signals such to ensure that all of the units turn on and off in unison, or to provide decorative patterns such as simultaneous or sequential blinking, strobing effects, etc. Of course, preferably electrical interconnection is used so that a compound optical and electrical conductor unit can be powered by its neighbor should its own power source fail.

The present compound conductor and connector invention may be applied to virtually any mating surface, as desired. A primary application of the present invention is for relatively long tractor trailers, where the continuously lighted optical conductor span provides a significant advantage over existing plural marker lights of conventional trailer light installations. Moreover, the present optical conductor, with its multiple LED embodiments, can provide color changes depending upon the specific LED(s) energized, to correspond with brake lights, turn signals, etc., as desired. Columnators may be provide to each side of the light sources to focus the light from the light source(s) to each optical conductor extending from the side or end of the connector, thereby serving to compensate for light attenuation through the optical conductors.

The present invention is also adaptable to any of a number of other stationary and moving structures, such as narrow loading docks for guidance in poorly lighted conditions, stairways and particularly hand rails, theater aisles, boats and ships, aircraft, etc. The present compound conductors may be secured to any of these structures by conventional adhesive means or mechanical means (nuts and bolts, screws, blind fasteners, etc.), as desired, for adaptability to virtually any stationary or moving vehicle or other structure. The present invention thus provides a significant advance in safety for anyone or any structure or vehicle which has occasion to operate in less than optimally lighted areas.

It is to be understood that the present invention is not limited to the embodiments described above, but encompasses any and all embodiments within the scope of the following claims.

What is claimed is:

1. A compound optical and electrical device, comprising:
a first elongate compound optical and electrical conductor;
at least one optical conductor disposed within said first compound conductor;
a longitudinally disposed peripheral electrical conductor channel formed along said optical conductor;
an electrical conductor assembly installed within said electrical conductor channel;
said electrical conductor assembly comprising at least one electrical conductor and light reflective means, with said light reflective means disposed inwardly in said electrical conductor channel relative to said at least one electrical conductor;
a second compound connector for removably attaching to said first compound conductor;
means for concentrically connecting said second compound connector with said optical conductor of said first compound conductor for passing light therethrough,
means for electrically connecting an electrical conductor of said second compound connector to said at least one electrical conductor of said first compound conductor,
electrical lighting means disposed within said second compound connector, for compensating for light attenuation from said optical conductor of said first compound conductor,
said lighting means receiving operative electrical power from said electrical conductor of said first compound conductor, wherein said lighting means of said second compound connector comprises a plurality of lights;
said first electrical conductor further comprising a plurality of electrical conductors corresponding in number to said plurality of lights, for selectively providing power to at least one of said lights as desired;
wherein each of said lights comprises a light emitting diode; and
each of said lights is colored differently from one another for selectively providing differently colored light to said optical conductor as desired; and
wherein including the power for said first and second optional connectors is provided by a solar cell power source.

2. A compound optical and electrical device, comprising:
at least one elongate compound optical and electrical conductor;
at least one optical conductor disposed within said compound conductor;
a longitudinally disposed peripheral electrical conductor channel formed along said optical conductor;
an electrical conductor assembly installed within said electrical conductor channel; and
said electrical conductor assembly comprising at least one electrical conductor and light reflective means, with said light reflective means disposed inwardly in said electrical conductor channel relative to said at least one electrical conductor;
wherein said cover is selected from the group consisting of a partially surrounding jacket and an elongate retainer having an open side.

3. The compound device according to claim 2, wherein said light reflective means comprises a plurality of laterally disposed ridges extending across said electrical conductor assembly.

4. A compound optical and electrical device, comprising:
at least one elongate compound optical and electrical conductor;
at least one optical conductor disposed within said compound conductor;
a longitudinally disposed peripheral electrical conductor channel formed along said optical conductor;
an electrical conductor assembly installed within said electrical conductor channel; and
said electrical conductor assembly comprising at least one electrical conductor and light reflective means, with said light reflective means disposed inwardly in said electrical conductor channel relative to said at least one electrical conductor;
wherein said electrical conductor is connected to a solar cell power source.

5. The compound device according to claim 4, wherein said solar cell is mounted to a surface of said compound device.

6. The compound device according to claim 5 further including a battery storage unit electrically connected between said solar cell and said at least one electrical conductor.

* * * * *